United States Patent
Taniguchi et al.

(10) Patent No.: US 9,503,616 B2
(45) Date of Patent: Nov. 22, 2016

(54) IMAGE CAPTURING APPARATUS

(71) Applicant: CANON KABUSHIKI KAISHA, Tokyo (JP)

(72) Inventors: Hidenori Taniguchi, Zama (JP); Minoru Hirose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 14/183,699

(22) Filed: Feb. 19, 2014

(65) Prior Publication Data

US 2014/0240550 A1  Aug. 28, 2014

(30) Foreign Application Priority Data

Feb. 27, 2013  (JP) ................................. 2013-037693
Mar. 14, 2013  (JP) ................................. 2013-051137

(51) Int. Cl.
| | |
|---|---|
| H04N 5/217 | (2011.01) |
| H04N 9/083 | (2006.01) |
| G03B 13/00 | (2006.01) |
| H04N 5/232 | (2006.01) |
| H04N 5/369 | (2011.01) |
| H04N 9/04 | (2006.01) |

(52) U.S. Cl.
CPC .......... H04N 5/217 (2013.01); H04N 5/23212 (2013.01); H04N 5/3696 (2013.01); H04N 9/045 (2013.01)

(58) Field of Classification Search
None
See application file for complete search history.

(56) References Cited

U.S. PATENT DOCUMENTS

| | | | |
|---|---|---|---|
| 8,908,070 B2* | 12/2014 | Uranishi | H01L 27/14818 348/222.1 |
| 2007/0258657 A1* | 11/2007 | Kryda et al. | 382/261 |
| 2011/0001859 A1* | 1/2011 | Matsuura et al. | 348/296 |
| 2011/0025888 A1* | 2/2011 | Nishizawa et al. | 348/249 |

FOREIGN PATENT DOCUMENTS

| | | |
|---|---|---|
| JP | 2009-124573 A | 6/2006 |
| JP | 2009-122524 A | 6/2009 |
| JP | 2013-013007 A | 1/2013 |

OTHER PUBLICATIONS

The above foreign patent document was cited in the Oct. 11, 2016 Japanese Office Action, which is inclosed without an English Translation, that issued in Japanese Patent Application No. 2013051137.

* cited by examiner

*Primary Examiner* — Aung S Moe
*Assistant Examiner* — Euel Cowan
(74) *Attorney, Agent, or Firm* — Cowan, Liebowitz & Latman, P.C.

(57) ABSTRACT

An image capturing apparatus comprises an image sensor constructed by replacing some of a plurality of image forming pixels of the image sensor with focus detecting pixels, a comparison unit configured to compare outputs of the image forming pixels as a plurality of correction targets adjacent to the focus detecting pixel with outputs of a plurality of reference image forming pixels of the same color as the plurality of image forming pixels arranged in the vicinity of the plurality of image forming pixels adjacent to the focus detecting pixel, and a correction unit configured to execute correction processing of the outputs of the image forming pixels as the plurality of correction targets in accordance with a comparison result of the comparison unit.

35 Claims, 13 Drawing Sheets

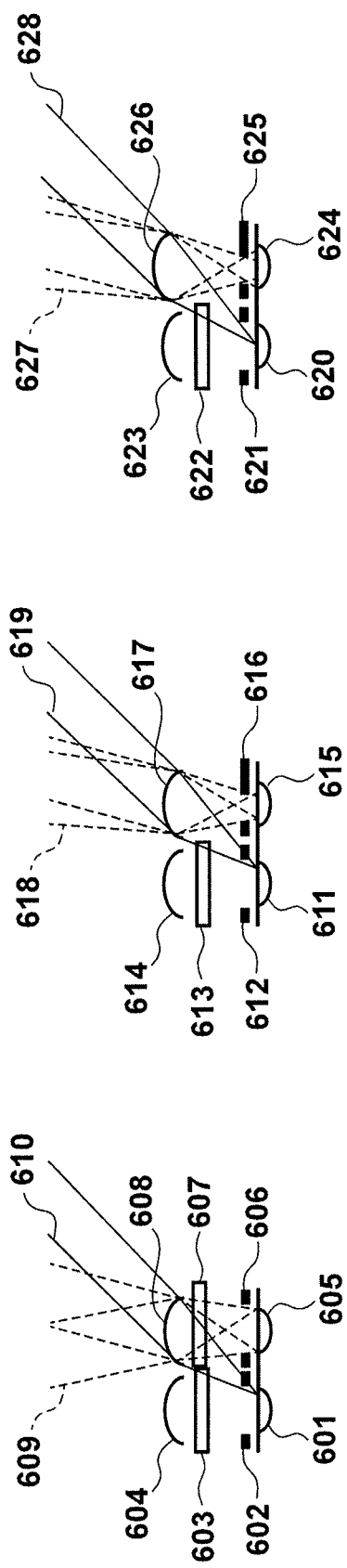

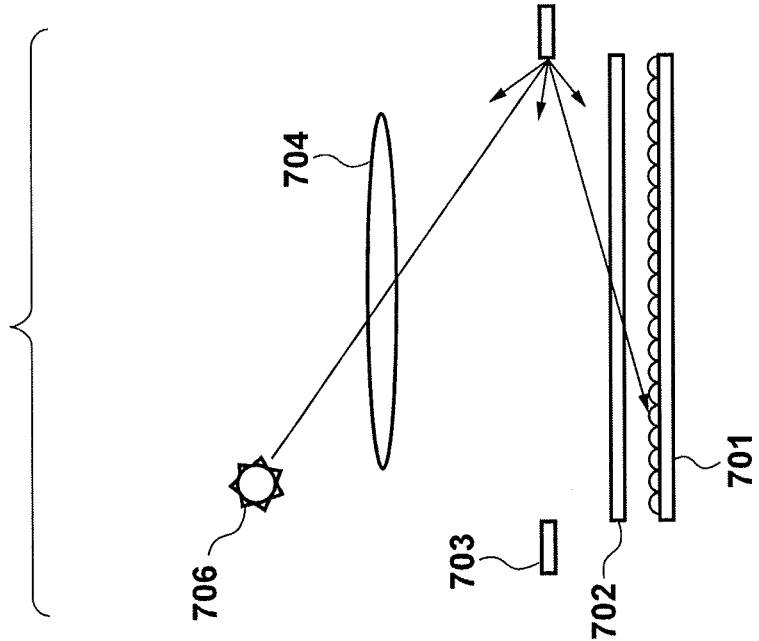
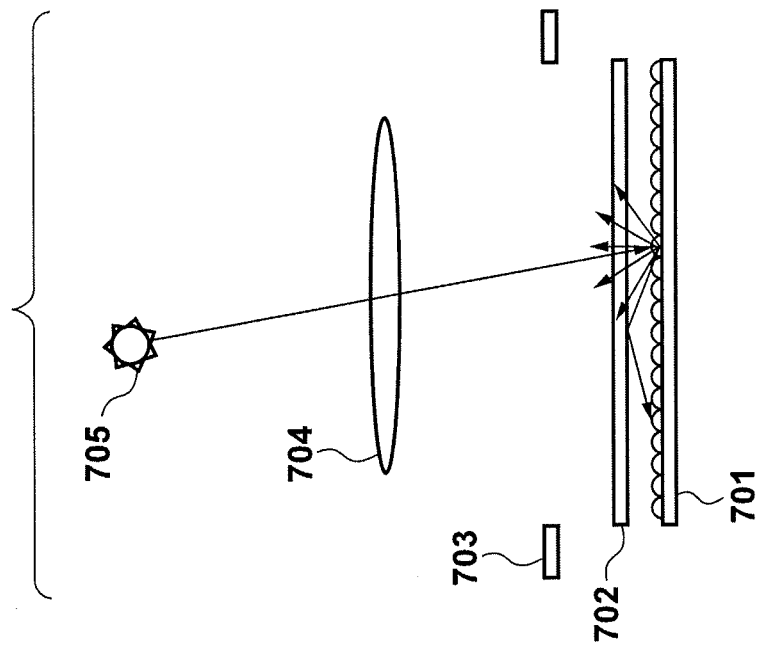

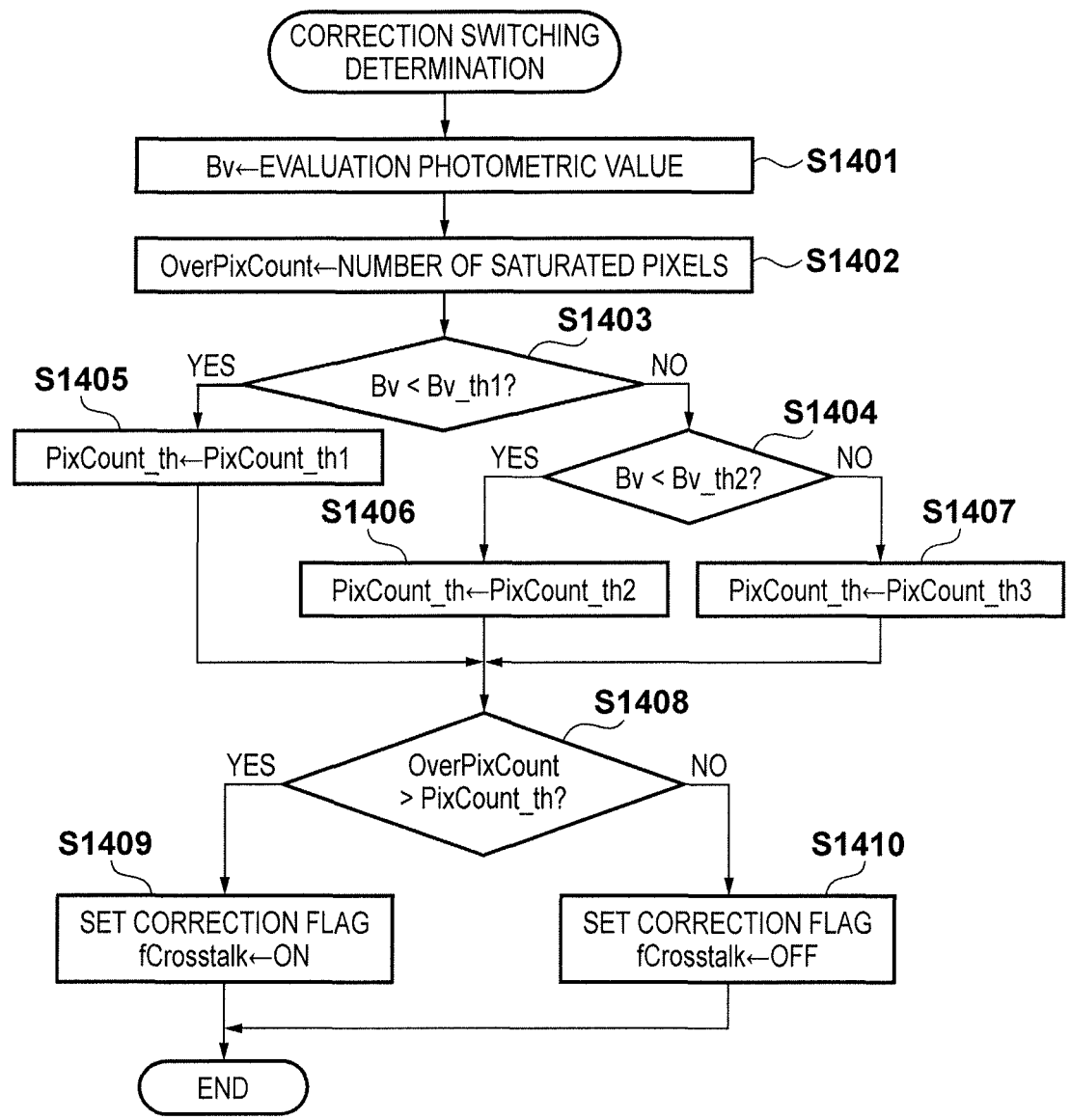

IMAGE CAPTURING APPARATUS

BACKGROUND OF THE INVENTION

Field of the Invention

The present invention relates to an image capturing apparatus.

Description of the Related Art

An image capturing apparatus is known in which image forming pixels and a pair of focus detecting pixels capable of receiving light beams of different pupil positions of the imaging lens and detecting the defocus amount and direction of the imaging lens based on the image shift amount are arranged in the image sensor so that the image sensor can simultaneously implement image capturing and focus detection.

In the image sensor including the image forming pixels and the focus detecting pixels, image quality degrades due to the focus detecting pixels having a structure different from the image forming pixels. Japanese Patent Laid-Open Nos. 2009-122524 and 2009-124573 disclose techniques of preventing image quality degradation caused by the focus detecting pixels.

However, the above-described related arts describe a technique of correcting the output of a focus detecting pixel by peripheral image forming pixels and a technique of correcting peripheral image forming pixels using the output of a focus detecting pixel. For this reason, correcting crosstalk caused by the microlens of the focus detecting pixel is not taken into consideration.

SUMMARY OF THE INVENTION

The present invention has been made in consideration of the above-described problem, and suppresses image quality degradation caused by optical crosstalk that occurs due to the microlens of a focus detecting pixel arranged in an image sensor.

According to the first aspect of the present invention, there is provided an image capturing apparatus comprising: an image sensor constructed by replacing some of a plurality of image forming pixels of the image sensor with focus detecting pixels; a comparison unit configured to compare outputs of the image forming pixels as a plurality of correction targets adjacent to the focus detecting pixel with outputs of a plurality of reference image forming pixels of the same color as the plurality of image forming pixels arranged in the vicinity of the plurality of image forming pixels adjacent to the focus detecting pixel; and a correction unit configured to execute correction processing of the outputs of the image forming pixels as the plurality of correction targets in accordance with a comparison result of the comparison unit.

Further features of the present invention will become apparent from the following description of exemplary embodiments with reference to the attached drawings.

BRIEF DESCRIPTION OF THE DRAWINGS

FIGS. 6A to 6C are views for explaining optical crosstalk of the image sensor;

FIGS. 7A and 7B are views showing examples of a shooting scene in which optical crosstalk occurs;

FIG. 16 is a flowchart for explaining correction switching according to the fourth embodiment.

DESCRIPTION OF THE EMBODIMENTS

The embodiments of the present invention will now be described in detail with reference to the accompanying drawings.

(First Embodiment)

Figure 1:
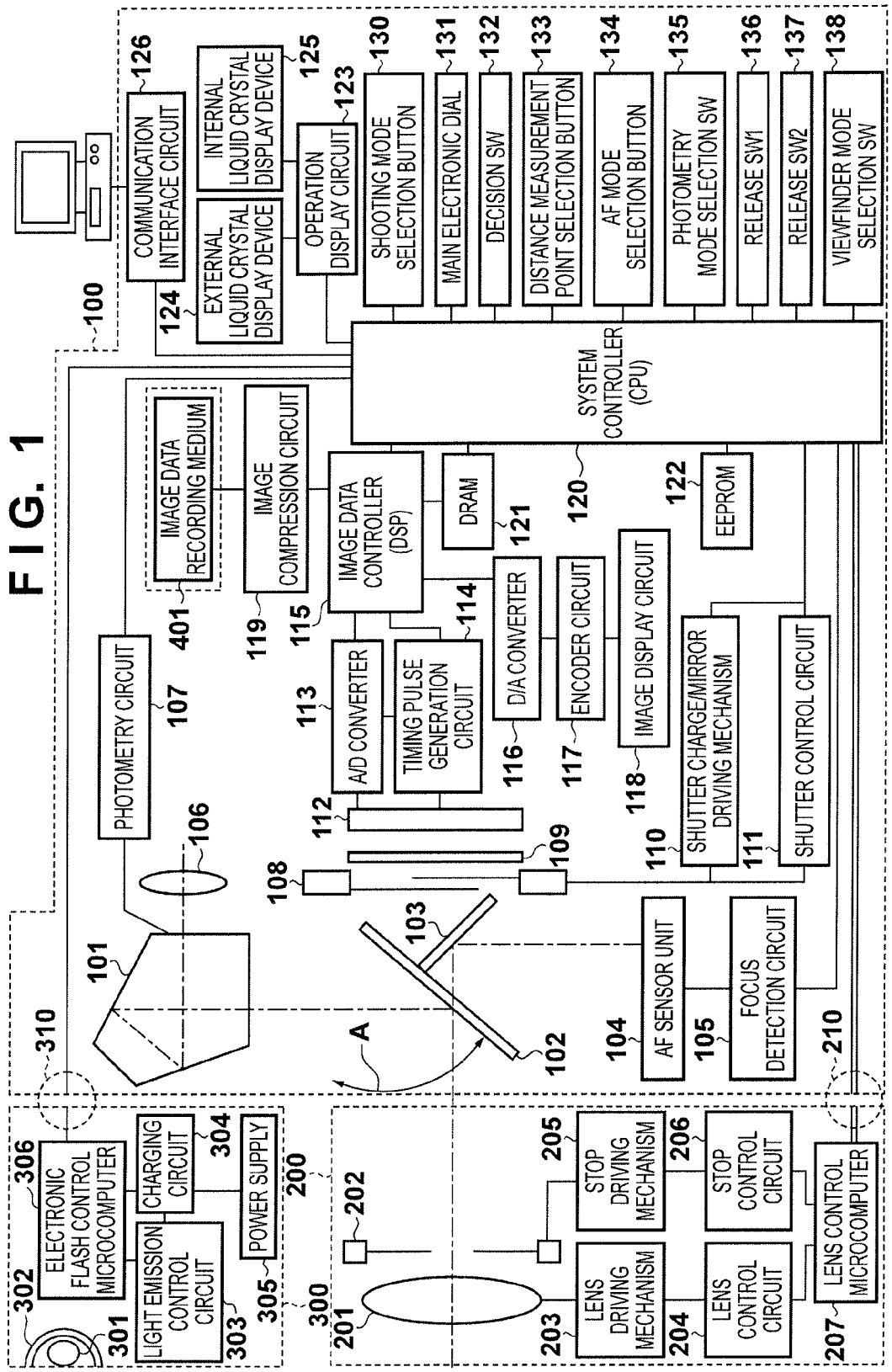
FIG. 1 is a block diagram showing the electrical arrangement of a single-lens reflex digital camera system that is an image capturing apparatus according to the first embodiment of the present invention.

FIG. 1 is a block diagram showing the electrical arrangement of a single-lens reflex digital camera system that is an image capturing apparatus according to the first embodiment of the present invention. As shown in FIG. 1, an imaging lens unit 200 is detachably attached to a digital camera 100 according to this embodiment via a mount mechanism (not shown). The mount portion includes an electric contact group 210. The contact group 210 has a function of exchanging control signals, status signals, data signals, and the like between the camera body 100 and the imaging lens 200 and supplying currents of various voltages, and also has a function of transmitting signals to a system controller 120 when the imaging lens unit is connected. This makes it possible to perform communication between the digital camera 100 and the imaging lens unit 200 and drive an imaging lens 201 and a stop 202 in the imaging lens unit. The contact group 210 may be configured to transmit not only electrical communication but also optical communication, voice communication, and the like.

Note that the imaging lens 201 is illustrated as one lens for the sake of convenience in this embodiment but is formed from more lenses in fact, as is known. The contact group 210 and the system controller 120 construct a lens detection means.

A shooting light beam from an object is guided to a quick return mirror 102 drivable in the direction of an arrow A via the imaging lens 201 and the stop 202. The central portion of the quick return mirror 102 is formed as a half mirror. The quick return mirror 102 passes some components of the light beam upon lowering. The transmitted light beam is reflected downward by a sub-mirror 103 mounted on the quick return mirror 102.

A known phase difference type AF sensor unit 104 is formed from a field lens arranged in the vicinity of an imaging plane (not shown), a reflecting mirror, a secondary imaging lens, a stop, and a line senor formed from a plurality of CCDs. Based on a control signal from the system controller 120, a focus detection circuit 105 controls the AF sensor unit 104 and performs focus detection by a known phase difference detection method. Note that the AF sensor unit 104 and the focus detection circuit 105 construct a focus detection means.

On the other hand, the shooting light beam reflected by the quick return mirror 102 reaches the user's eye via a pentaprism 101 and an eyepiece 106. A photometry sensor (not shown) disposed in the vicinity of the eyepiece 106 is a sensor configured to measure the luminance of the object, and its output is supplied to the system controller 120 via a photometry circuit 107. Note that the photometry sensor, the photometry circuit 107, and the system controller 120 construct a photometry means.

When the quick return mirror 102 rises, the light beam from the imaging lens 201 reaches, via a focal plane shutter 108 that is a mechanical shutter and a filter 109, an image sensor 112 represented by a CMOS sensor serving as an image sensor that is an image capturing means.

The filter 109 has two functions, a function of cutting infrared rays and guiding only visible rays to the image sensor 112 and a function as an optical low-pass filter. The focal plane shutter 108 includes a front curtain and a rear curtain, and controls transmission and blocking of the light beam from the imaging lens 201. Note that when the quick return mirror 102 rises, the sub-mirror 103 is folded.

The digital camera 100 according to this embodiment includes the system controller 120 serving as a control means of the entire digital camera and formed from a CPU in charge of control, and appropriately controls the operations of the respective units (to be described later). Note that the system controller 120 corresponds to a correction means.

A lens control circuit 204 that controls a lens driving mechanism 203 configured to move the imaging lens 201 in the optical axis direction and adjust focusing and a stop control circuit 206 that controls a stop driving mechanism 205 configured to drive the stop 202 are connected to the system controller 120 via a lens control microcomputer 207. A shutter charge/mirror driving mechanism 110 that controls the up/down driving unit of the quick return mirror 102 and the shutter charge of the focal plane shutter 108 is connected to the system controller 120. A shutter control circuit 111 configured to control traveling of the front curtain and rear curtain of the focal plane shutter 108 is also connected to the system controller 120. An EEPROM 122 serving as a storage means is connected to the system controller 120. The EEPROM 122 stores parameters that need to be adjusted to control the digital camera 100, camera ID information capable of identifying the individual digital camera, AF correction data adjusted by a reference lens, an auto exposure correction value, and the like.

The lens control microcomputer 207 also includes a lens storage device that stores information unique to each lens, for example, information such as a focal length, aperture stop, and lens ID assigned to each lens and information received from the system controller 120. The system controller 120 controls the lens driving mechanism 203 via the lens control microcomputer 207, thereby forming an object image on the image sensor 112. The system controller 120 also controls the stop driving mechanism 205 that drives the stop 202 based on a set Av value, and also outputs a control signal to the shutter control circuit 111 based on a set Tv value, thereby controlling exposure.

The driving source of the front curtain and rear curtain of the focal plane shutter 108 is formed from a spring. After traveling of the shutter, spring charge is necessary for the next operation. The shutter charge/mirror driving mechanism 110 controls the spring charge. In addition, the shutter charge/mirror driving mechanism 110 rises/lowers the quick return mirror 102.

An image data controller 115 is connected to the system controller 120. The image data controller 115 is formed from a DSP (Digital Signal Processor) and executes control of the image sensor 112, correction and manipulation of image data input from the image sensor 112, and the like based on commands from the system controller 120. The items of image data correction/manipulation include auto white balance. Auto white balance is a function of correcting the maximum luminance portion of a shot image to a predetermined color (white). Auto white balance can change the correction amount in accordance with an instruction from the system controller 120.

The system controller 120 and the image data controller 115 construct a second photometry means. In the second photometry means, the image data controller 115 divides an image signal into regions and supplies a value integrated on the Bayer pixel basis in each region to the system controller 120, and the system controller 120 evaluates the integrated signal, thereby performing photometry.

A timing pulse generation circuit 114 that outputs a pulse signal necessary for driving the image sensor 112, an A/D converter 113 configured to receive the timing pulse generated by the timing pulse generation circuit 114 together with the image sensor 112 and convert an analog signal corresponding to an object image output from the image sensor 112 into a digital signal, a DRAM 121 that temporarily stores obtained image data (digital data), a D/A converter 116, an image compression circuit 119, and a contrast detection circuit 140 are connected to the image data controller 115.

The DRAM 121 is used to temporarily store image data before manipulation or data conversion to a predetermined format. A recording medium 401 serving as a recording means is connected to the image compression circuit 119.

The image compression circuit 119 is a circuit configured to compress or convert (for example, JPEG compression) image data stored in the DRAM 121. The converted image data is stored in the recording medium 401. As the recording medium, a hard disk, a flash memory, a flexible disk, or the like is used. Note that the image data controller 115, the image compression circuit 119, and the recording medium 401 construct a recording means.

An image display circuit 118 is connected to the D/A converter 116 via an encoder circuit 117. The image display circuit 118 is a circuit configured to display the image data captured by the image sensor 112, and generally formed from a color liquid crystal display element.

The image data controller 115 causes the D/A converter 116 to convert image data on the DRAM 121 into an analog signal and output it to the encoder circuit 117. The encoder circuit 117 converts the output from the D/A converter 116 into a video signal (for example, NTSC signal) necessary when driving the image display circuit 118. Note that the D/A converter 116, the image display circuit 118, and the encoder circuit 117 construct an image display means.

The system controller 120 and the image data controller 115 construct a second focus detection means. The image data controller 115 evaluates the predetermined-direction contrast of an image signal obtained by passing corrected image data through a predetermined filter having a predetermined frequency characteristic and performing predetermined gamma processing, and supplies the result to the system controller 120. The system controller 120 communicates with the lens control circuit 204 and adjusts the focus position such that the contrast evaluation value becomes higher than a predetermined level. Note that the image data controller 115, the system controller 120, the lens control circuit 204, the lens driving mechanism 203, and the imaging lens 201 constructs a second auto focusing means.

In addition, an operation display circuit 123 that causes an external liquid crystal display device 124 or an internal liquid crystal display device 125 to display the operation mode information and exposure information (for example, shutter speed and f-number) of the digital camera 100, a shooting mode selection button 130 with which the user sets a mode to cause the digital camera 100 to execute a desired operation, a main electronic dial 131, a decision SW 132, a distance measurement point selection button 133 (corresponding to a distance measurement point selection means) configured to select a focus detection position to be used out of a plurality of focus detection positions of the AF sensor unit 104, an AF mode selection button 134, a photometry mode selection SW 135, a release SW1 136 configured to start a pre-shooting operation such as photometry and distance measurement, a release SW2 137 configured to start the image capturing operation, and a viewfinder mode selection SW 138 are connected to the system controller 120.

Note that the external liquid crystal display device 124 and the internal liquid crystal display device 125 correspond to an operation display means. In addition, the external liquid crystal display device 124 corresponds to an external display means, and the internal liquid crystal display device 125 corresponds to an internal display means. The operation display circuit 123 and the system controller 120 construct a display control means.

The viewfinder mode selection SW 138 switches between an optical viewfinder mode capable of confirming a light beam passing through the eyepiece 106 and a live view display mode that causes the image display circuit 118 to sequentially display an image signal received by the image sensor 112. The viewfinder mode selection SW 138 corresponds to a viewfinder mode selection means.

An electronic flash device 300 is detachably attached to the digital camera 100 via a mount mechanism (not shown). The mount mechanism includes an electric contact group 310. The contact group 310 exchanges control signals, status signals, data signals, and the like between the camera body 100 and the electronic flash device 300. The contact group 310 also has a function of transmitting signals to the system controller 120 when an X terminal (light-emitting terminal) that controls the light emission timing and the electronic flash device 300 are connected. This makes it possible to perform communication between the digital camera 100 and the electronic flash device 300 and control light emission of the electronic flash. The contact group 310 may be configured to transmit not only electrical communication but also optical communication, voice communication, and the like.

The electronic flash device 300 includes a xenon (Xe) tube 301, a reflector 302, a light emission control circuit 303 formed from, for example, an IGBT to control light emission of the Xe tube 301, and a charging circuit 304 that generates a voltage of about 300 V to be supplied to the Xe tube 301. The electronic flash device 300 also includes a power supply 305 such as a battery that supplies power to the charging circuit 304, and an electronic flash control microcomputer 306 that controls light emission, charging, and the like of the electronic flash and also controls communication with the system controller 120 on the camera side.

Figure 2:
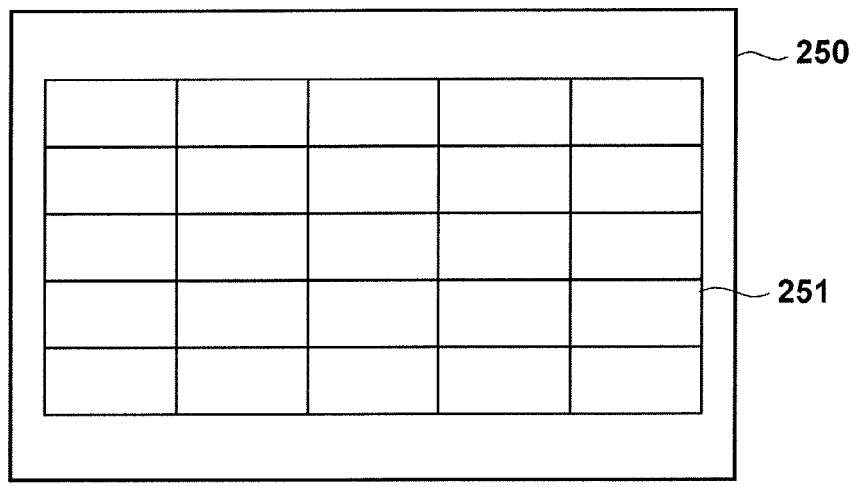
FIG. 2 is a view showing an example of a photometry point arrangement on an image sensor.

FIG. 2 is a view showing an area in which focus detecting pixels that are arranged on the shooting screen are arranged. Referring to FIG. 2, reference numeral 250 denotes a shooting screen; and 251, an arrangement area of the focus detecting pixels arranged on the shooting screen. In this embodiment, the focus detecting pixels arranged on the shooting screen 250 are grouped to divide the shooting screen 250 into 5×5 rectangles and form 25 distance measurement points. Note that the focus detecting pixel arrangement area and the distance measurement points are merely examples and are not limited to those shown in FIG. 2.

Figure 3:
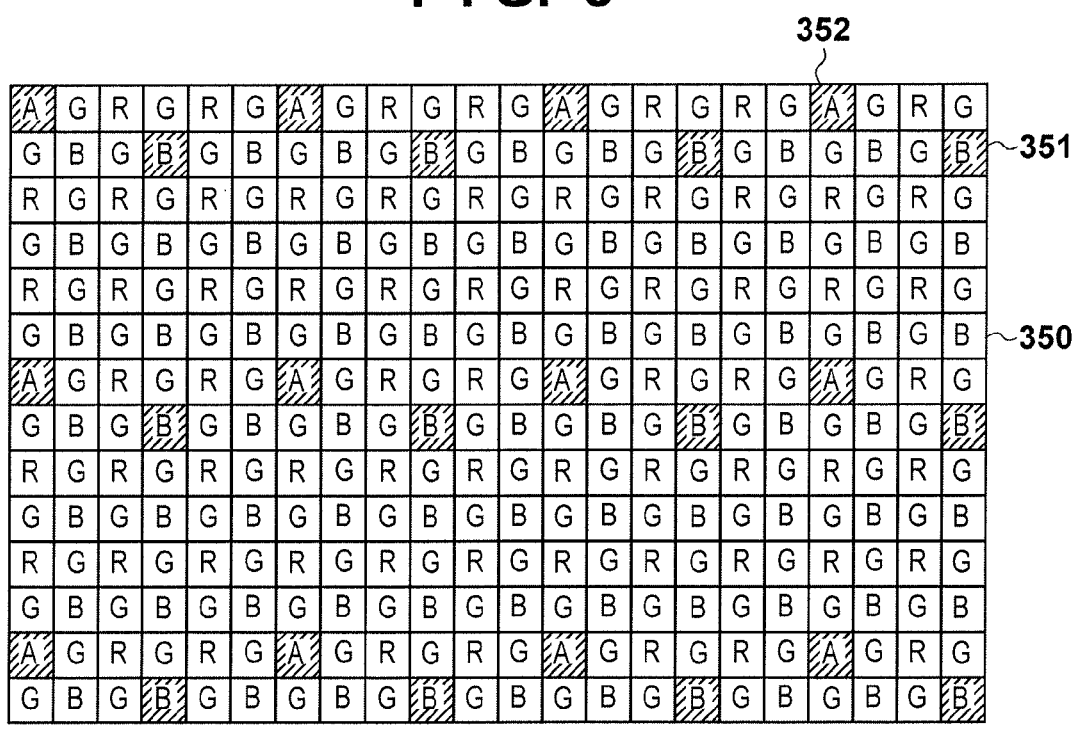
FIG. 3 is a view showing details of the arrangement of image forming pixels and focus detecting pixels in the image sensor.

FIG. 3 is a view showing details of the pixel arrangement of the image sensor constructing the shooting screen. Referring to FIG. 3, reference numeral 350 denotes an image sensor. The image sensor 350 is formed by arranging so-called R, G, and B primary color filters in a Bayer matrix. Reference numerals 351 and 352 denote a pair of focus detecting pixels for phase difference detection. A indicates an A image as a reference pixel of phase difference detection; and B, a B image as a reference pixel of phase difference detection. The arrangement of the A and B images is apparent from FIG. 3, and a description thereof will be omitted.

The arrangement of the image sensor is merely an example and is not limited to this arrangement. The filters may be complementary color filters and need not always be arranged in the Bayer matrix. Similarly, the arrangement of the focus detecting pixels is not limited to the arrangement shown in FIG. 3.

Figure 4:
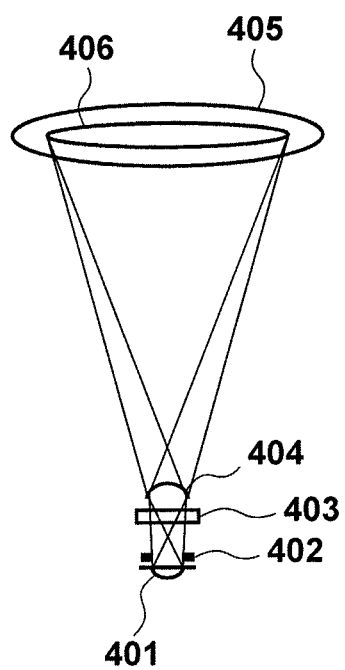
FIG. 4 is a view showing the detailed structure of the image forming pixel.

FIG. 4 is a view schematically showing the structure of an image forming pixel. Referring to FIG. 4, reference numeral 401 denotes a photodiode; and 402, a lowermost interconnection layer shown for the sake of comparison with a focus detecting pixel (to be described later). The remaining interconnection layers and structural members irrelevant to the description of this embodiment are not illustrated. Reference numeral 403 denotes a color filter; 404, a microlens configured to condense the shooting light beam and improve the light-receiving efficiency; 405, a pupil of the imaging lens; and 406, a light-receiving range of the photodiode 401 by the microlens. The curvature of the microlens of the image forming pixel is set such that a light beam in the almost same region as the pupil of the imaging lens enters the photodiode.

Figure 5:
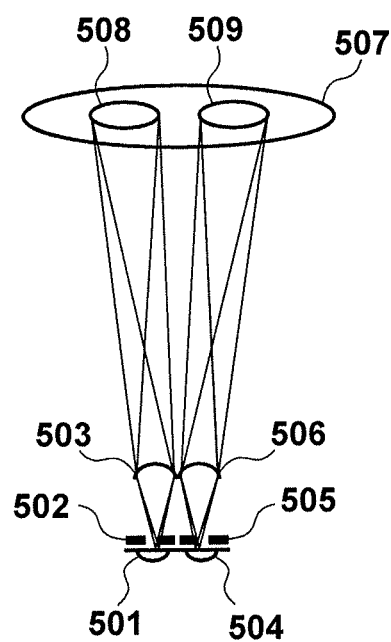
FIG. 5 is a view showing the detailed structure of the focus detecting pixel.

FIG. 5 is a view schematically showing the structure of a pair of focus detecting pixels. Referring to FIG. 5, reference numeral 501 denotes a photodiode having the same structure as the photodiode 401 shown in FIG. 4. Reference numeral 502 denotes a lowermost interconnection layer that is configured, unlike the interconnection layer 402 of the image forming pixel, to block the light beam that enters the left half of the photodiode 501 and form the A image for phase difference detection. Reference numeral 503 denotes a microlens configured to condense the light beam that enters the photodiode 501.

Reference numeral 504 denotes a photodiode having the same structure as the photodiode 401 shown in FIG. 4. Reference numeral 505 denotes a lowermost interconnection layer that is configured, unlike the interconnection layer 402 of the image forming pixel, to block the light beam that enters the right half of the photodiode 504 and form the B image for phase difference detection. Reference numeral 506 denotes a microlens configured to condense the light beam that enters the photodiode 504; and 507, a pupil of the imaging lens.

Reference numerals 508 and 509 denote ranges of the pupil of the imaging lens in which the light beams enter the photodiodes 501 and 504. As is apparent from FIG. 5, the light beam that enters the photodiode 501 is displaced to the left side with respect to the optical axis of the pupil of the imaging lens, and the light beam that enters the photodiode 504 is displaced to the right side with respect to the optical axis of the pupil of the imaging lens. The pixels are configured to change the light blocking position between the interconnection layers 502 and 505, thereby implementing pupil division and performing phase difference type focus detection.

When each focus detecting pixel is formed from a microlens and a lowermost interconnection layer, the focus position is preferably different from that of the microlens of the image forming pixel. That is, each of the microlenses 503 and 506 of the focus detecting pixels is preferably formed so as to have a curvature different from that of the image forming pixel and place its focus position in the interconnection layer. The color filter of each focus detecting pixel is transparent or green (G). To increase the signal light and raise the S/N ratio, a transparent filter is preferably used. In this embodiment, a description will be made assuming a transparent filter.

FIGS. 6A to 6C are views for explaining image quality degradation caused by optical crosstalk. FIGS. 6A, 6B, and 6C show an arrangement in which image forming pixels are adjacent, an arrangement in which an image forming pixel and a focus detecting pixel whose microlens has the same curvature that of the image forming pixel are adjacent, and an arrangement in which an image forming pixel and a focus detecting pixel whose microlens has a curvature different from that of the image forming pixel are adjacent, respectively.

Referring to FIG. 6A, reference numeral 601 denotes a photodiode; 602, a lowermost interconnection layer; 603, a color filter assumed to be a G (green) filter in the following explanation; 604, a microlens; 605, a photodiode adjacent to the right side of the photodiode 601; 606, a lowermost interconnection layer; 607, a color filter that is of a color different from the color filter 603 and is assumed to be a B (blue) filter; 608, a microlens; 609, a shooting light beam that enters from the imaging lens, which enters the photodiode immediately under the microlens; and 610, a light beam that enters at an angle impossible in a normal imaging lens light beam. As is apparent from FIG. 6A, if the incident angle is small, the light beam enters the adjacent photodiode 601 via the color filters 603 and 607, resulting in optical crosstalk.

Referring to FIG. 6B, reference numeral 611 denotes a photodiode; 612, a lowermost interconnection layer; 613, a color filter assumed to be a G (green) filter in the following explanation; 614, a microlens; 615, a photodiode adjacent to the right side of the photodiode 611; 616, a lowermost interconnection layer; and 617, a microlens. Since this pixel is a focus detecting pixel, no color filter exists. Reference numeral 618 denotes a shooting light beam that enters from the imaging lens, which enters the photodiode immediately under the microlens; and 619, a light beam that enters at an angle impossible in a normal imaging lens light beam. As is apparent from FIG. 6B, if the incident angle is small, the light beam enters the adjacent photodiode 611 via the color filter 613 and the transparent portion of the focus detecting pixel, resulting in optical crosstalk. In FIG. 6A, the light beam passes through the B filter 607 and leaks to the adjacent photodiode 601. In FIG. 6B, however, the light beam leakage amount is larger because of the absence of the color filter. That is, the amount of optical crosstalk to the photodiode 611 increases by the difference of the filter, and the G pixel adjacent to the focus detecting pixel looks prominent as compared to the peripheral pixels because the output is large.

Referring to FIG. 6C, reference numeral 620 denotes a photodiode; 621, a lowermost interconnection layer; 622, a color filter assumed to be a G (green) filter in the following explanation; 623, a microlens; 624, a photodiode adjacent to the right side of the photodiode 620; 625, a lowermost interconnection layer; and 626, a microlens. Since this pixel is a focus detecting pixel, no color filter exists. Reference numeral 627 denotes a shooting light beam that enters from the imaging lens, which enters the photodiode immediately under the microlens; and 628, a light beam that enters at an angle impossible in a normal imaging lens light beam. As is apparent from FIG. 6C, if the incident angle is small, the light beam enters the adjacent photodiode 620 via the color filter 622 and the transparent portion of the focus detecting pixel, resulting in optical crosstalk.

In FIG. 6C, the microlens of the focus detecting pixel is made high, and the curvature of the microlens is changed such that the focus position is located in the interconnection layer 625. For this reason, the light beam enters a position closer to the center of the photodiode 620 as compared to FIG. 6B, and the optical crosstalk amount becomes still larger than in FIG. 6B. The prominence amount of the adjacent G pixel further increases, and the image quality further degrades.

FIGS. 7A and 7B are views for explaining shooting scenes in which the optical crosstalk described with reference to FIGS. 6A to 6C is particularly problematic. Referring to FIG. 7A, reference numeral 701 denotes a section of the image sensor; 702, a cover glass of the image sensor; 703, a light shielding mask configured to cut excessive light reflected by the lens barrel or a mechanical member; 704, an imaging lens; and 705, a high-luminance object such as the sun in a backlighted scene or a high-luminance spotlight in a night scene.

For example, in such a scene, when the light of the high-luminance object enters the image sensor 701 via the imaging lens, a certain ratio of light is diffused and reflected by the image sensor surface. The diffused and reflected light is partially further reflected by the cover glass and partially returns to the image sensor. Upon entering the focus detecting pixel at the angle as described with reference to FIGS. 6A to 6C, the light enters the adjacent image forming pixel as optical crosstalk. The output of this image forming pixel is prominent as compared to the peripheral image forming pixels, and the image quality degrades. This image quality degradation is unnoticeable in a scene without a large luminance difference but problematic in a scene where a high-luminance object such as the sun or spotlight exists. The same reflection exists even in an image sensor without focus detecting pixels. However, it is unnoticeable because the pixels are arranged evenly.

FIG. 7B shows the same scene as described above except that the incident position of the light from a high-luminance object 706 is different from FIG. 7A, and the light directly enters the end face of the light shielding member 703. In this case as well, the light may enter the focus detecting pixel at the angle as described with reference to FIG. 7A. In this case, however, reflection occurs on the end face of the light shielding mask. Since the light shielding mask itself is very thin, the incident angle of the light from the high-luminance object is very limited, and the reflection occurs at a very low probability.

As described above, when focus detecting pixels having a structure different from a normal pixel are formed in the image sensor, an image quality degradation by possible optical crosstalk needs to be detected and corrected. As is apparent from the drawings, the image quality degradation by optical crosstalk occurs at a place relatively far apart from the high-luminance light source, and is especially unnaturally noticeable at a portion where the object luminance is lower than the luminance of the light source, and the contrast is low.

Figure 8:
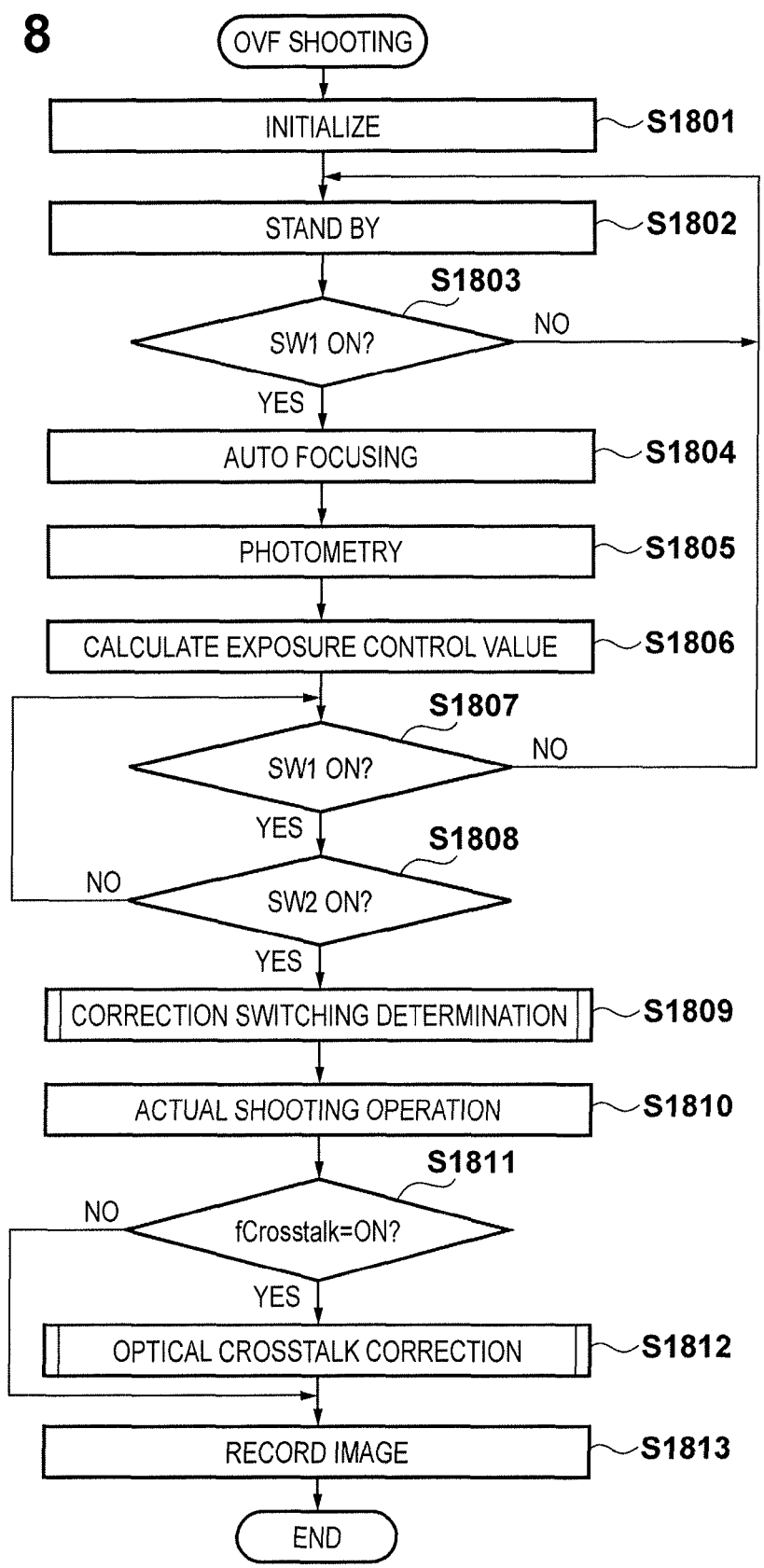
FIG. 8 is a flowchart for explaining a shooting operation according to the first embodiment.
Figure 9:
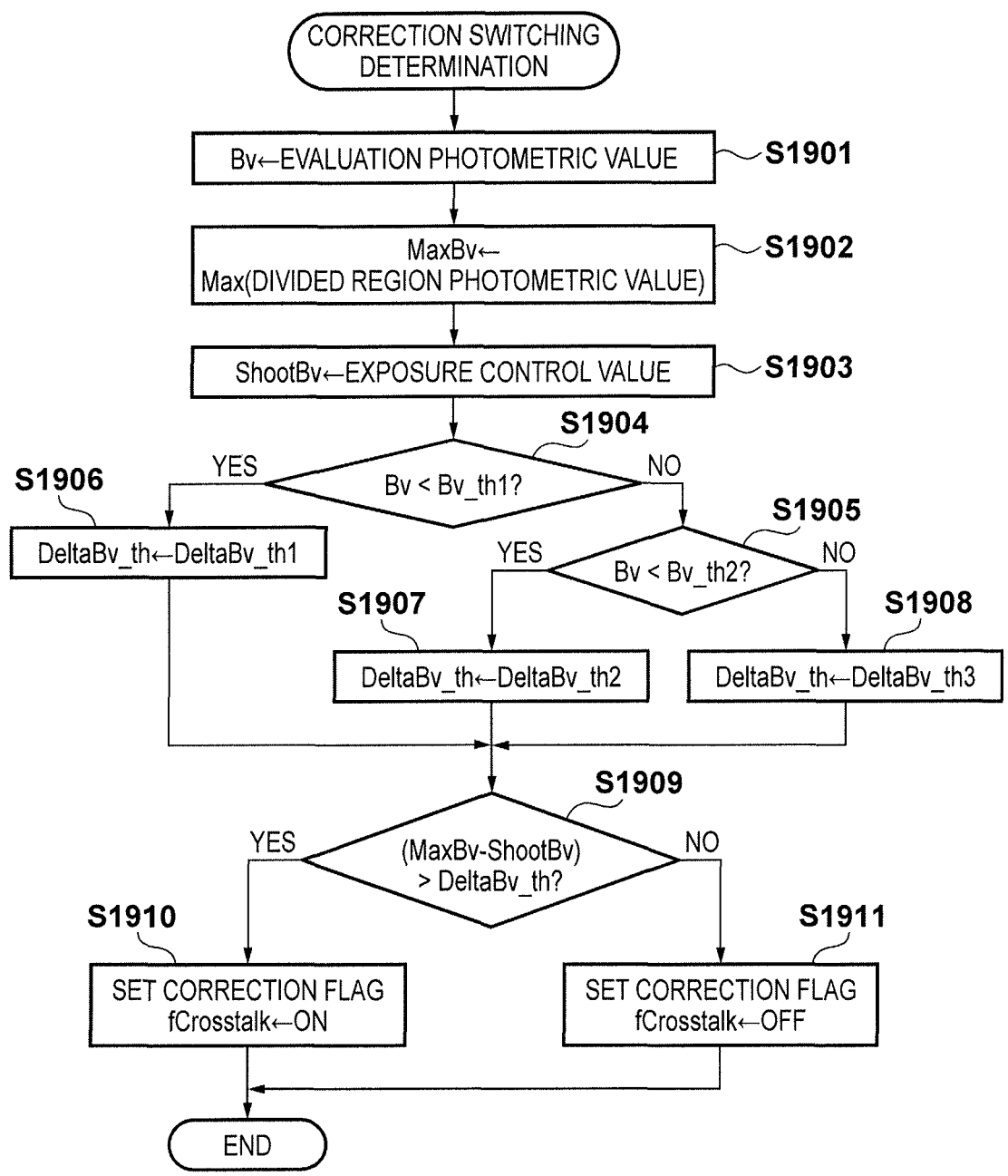
FIG. 9 is a flowchart for explaining correction switching according to the first embodiment.

The operation of the system according to this embodiment having the above-described arrangement will be described with reference to FIGS. 8 to 12. FIGS. 8 and 9 are flowcharts for explaining a correction operation when shooting a still image by the camera according to this embodiment while confirming the object using the optical viewfinder.

In step S1801, when the operator turns on the power switch of the camera, the system controller 120 confirms the operations of the actuators and the image sensor in the camera and initializes the memory contents and execution programs, and also executes the pre-shooting operation. In step S1802, the camera completes the pre-shooting operation and stands by. The user confirms the object through the optical viewfinder and does various shooting settings.

In step S1803, it is determined whether the switch SW1 is turned on. If the switch SW1 is not turned on, the process returns to step S1802 to stand by. If the switch SW1 is turned on, the process advances to step S1804. In step S1804, AF (Auto Focusing) of bringing the object into focus of the imaging lens is performed. In accordance with a control signal from the system controller 120, the focus detection circuit 105 controls the AF sensor unit 104 and performs focus detection by the known phase difference detection method. In addition, the system controller 120 controls the lens driving mechanism 203 via the lens control microcomputer 207, thereby forming the object image on the image sensor 112.

In step S1805, the photometry sensor disposed in the vicinity of the eyepiece 106 measures the luminance of the object. The output of the photometry sensor is supplied to the system controller 120 via the photometry circuit 107.

Figures 10, 11:
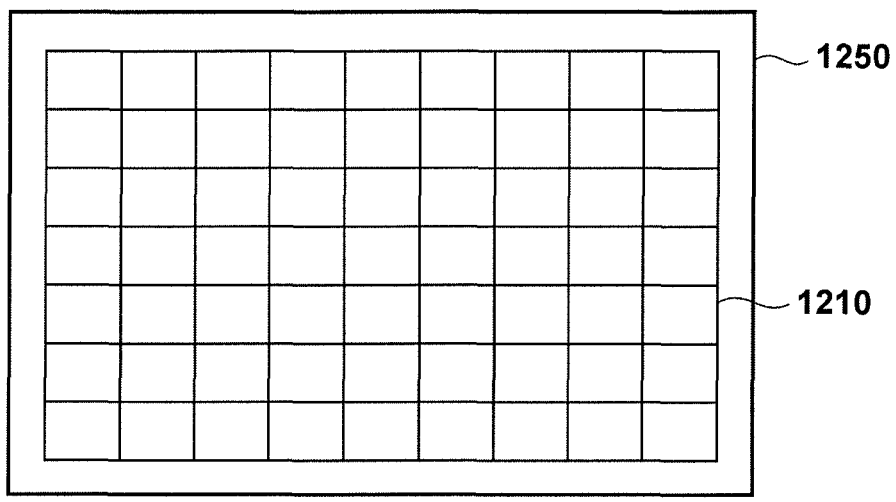
FIG. 10 is a view showing a divided photometry region according to the first embodiment.
FIG. 11 is a view showing a detailed arrangement of pixels used to correct optical crosstalk.

FIG. 10 illustrates the divided regions of the visual field on the photometry sensor. FIG. 10 shows a shot image region 1250 and a photometry region 1210. In addition, nine horizontal divided photometry regions and seven vertical divided photometry regions are provided in the photometry region. The system controller 120 calculates the object luminance in each divided photometry region based on a signal supplied from the photometry circuit 107. Furthermore, averaging and correction calculation are performed based on a predetermined algorithm, thereby calculating a photometric value indicating the brightness of the object in the shot image region.

In step S1806, the system controller 120 performs exposure control value calculation to decide the exposure condition in the still image shooting. As the exposure control value calculation, the stop, ISO speed, accumulation time, and the like are adjusted based on the program diagram and the photometric value calculated in step S1805, thereby performing auto exposure control (AE) in still image shooting (to the described later). When a manual exposure mode is set, the exposure is decided based on the stop, accumulation time, and ISO speed designated by the operator, and still image shooting is performed.

In step S1807, it is determined whether the switch SW1 is turned on. If the switch SW1 is not turned on, the process returns to step S1802 to stand by. If the switch SW1 is turned on, the process advances to step S1808. In step S1808, it is determined whether the switch SW2 is turned on. If the switch SW2 is not turned on, the process returns to step S1807 to determine the state of the switch SW1. If the switch SW2 is turned on, the process advances to step S1809.

In step S1809, the system controller 120 executes correction operation switching determination. In the correction operation switching determination, it is determined whether to execute optical crosstalk correction in still image shooting (to be described later).

The image quality degradation by optical crosstalk occurs when the shooting light beam partially enters the photodiode at a specific angle, as described above. Especially, the image quality degradation poses a problem when a high-luminance light source such as the sun or spotlight exists in the object to be shot or in, for example, a night scene with dark background. In optical crosstalk correction processing to be described later, correction target pixel determination is done to determine on the pixel basis whether optical crosstalk occurs, and execution of correction processing is switched. However, an object of a specific pattern such as a small point source yields an adverse effect of correction so that a detection error occurs in the correction target pixel determination, and the original object is erroneously corrected.

To prevent this, in this embodiment, a scene where image quality degradation by optical crosstalk occurs is determined based on high-luminance light source detection and the shooting conditions, and the correction operation is appropriately performed, thereby suppressing the image quality degradation by the adverse effect of correction.

FIG. 9 is a flowchart for explaining details of correction operation switching determination according to this embodiment. In step S1901, the photometric value calculated in step S1805 of FIG. 8 is stored in a variable Bv. In step S1902, the maximum value of the luminance value in each divided photometry region calculated in step S1805 of FIG. 8 is stored in a variable MaxBv.

In step S1903, the exposure control value that is the exposure condition of still image shooting calculated in step S1806 of FIG. 8 is stored in a variable ShootBv. In step S1904, the variable Bv is compared with a threshold Bv_th1 (it is checked whether the variable Bv falls within a predetermined luminance range). If the variable Bv is smaller than the threshold, the process advances to step S1906 to store a predetermined value DeltaBv_th1 in a variable DeltaBv_th. If the variable Bv is equal to or larger than the threshold (equal to or larger than the predetermined luminance value) in step S1904, the process advances to step S1905. As the threshold Bv_th1, an appropriate luminance value used to determine, for example, a night scene is set.

In step S1905, the variable Bv is compared with a threshold B_th2. If the variable Bv is smaller than the threshold, the process advances to step S1907 to store a predetermined value DeltaBv_th2 in the variable DeltaBv_th. If the variable Bv is equal to or larger than the threshold in step S1905, the process advances to step S1908 to store a predetermined value DeltaBv_th3 in the variable DeltaBv_th. As the threshold Bv_th2, an appropriate luminance value used to determine, for example, a daytime scene is set.

In steps S1904 to S1908, shooting scene determination is done based on the photometric value, and the variable DeltaBv_th of an appropriate correction switching determination threshold is set for each shooting scene in which the optical crosstalk occurrence condition is different. The correction switching determination threshold is preferably appropriately set in accordance with the condition and frequency of noticeable optical crosstalk via actual shooting or the like.

In step S1909, the difference between the variable MaxBv (maximum luminance value) and the variable ShootBv (shooting exposure control value) is calculated and compared with the variable DeltaBv_th. That is, it is determined whether a bright light source having a predetermined light amount or more with respect to the appropriate level of the exposure control value upon shooting exists. In this determination, to solve the problem that the influence of image quality degradation caused by optical crosstalk is readily noticeable when shooting in a long shutter mode is performed under a light source as bright as a mercury lamp in a park, not the absolute brightness of the light source but the brightness relative to the shooting exposure is used to enable appropriate light source determination. If the difference is smaller than the variable DeltaBv_th, the process advances to step S1910 to set ON in a variable fCrosstalk that is the enable flag of the optical crosstalk correction operation. If the difference is equal to or larger than the variable DeltaBv_th, the process advances to step S1911 to set OFF in the variable fCrosstalk that is the enable flag of the optical crosstalk correction operation.

In steps S1901 to S1911, the correction operation switching determination is performed, and the process then returns to the main flow of FIG. 8. In step S1810 of FIG. 8, after shutter charge and stop adjustment, the actual shooting operation of making the front curtain and rear curtain run in a set accumulation time is performed, and pixel signals are sequentially read from the image sensor 112.

In step S1811, it is determined that the variable fCrosstalk that is the enable flag of the optical crosstalk correction operation determined in step S1809 is ON. If the variable fCrosstalk is ON, the process advances to step S1812. If the variable fCrosstalk is not ON, the process advances to step S1813 to record the image and end the processing.

In step S1812, the optical crosstalk correction processing according to this embodiment is executed for each pixel. FIG. 11 is a view for explaining the correction according to this embodiment. Reference numeral 801 indicates part of the image sensor 350. The hatched B pixel in 801 represents the B image of the focus detecting pixel. The G upper, G lower, G left, and G right pixels in FIG. 11 are image forming pixels adjacent to the upper, lower, left, and right sides of the B image pixel. These pixels are correction target pixels that cause image quality degradation under the influence of optical crosstalk. Image forming pixels G1, G2, G3, and G4 are reference pixels of the same color as the four correction target pixels, and are used to determine whether the correction target pixels are prominent as compared to the peripheral image forming pixels under the influence of optical crosstalk.

The four R pixels diagonally adjacent to the B image pixel are correction target pixels influenced by optical crosstalk as well. These pixels can be corrected by the same correction method as that of the G upper, G lower, G left, and G right pixels except that different reference pixels are used, and a description thereof will be omitted.

Figure 12:
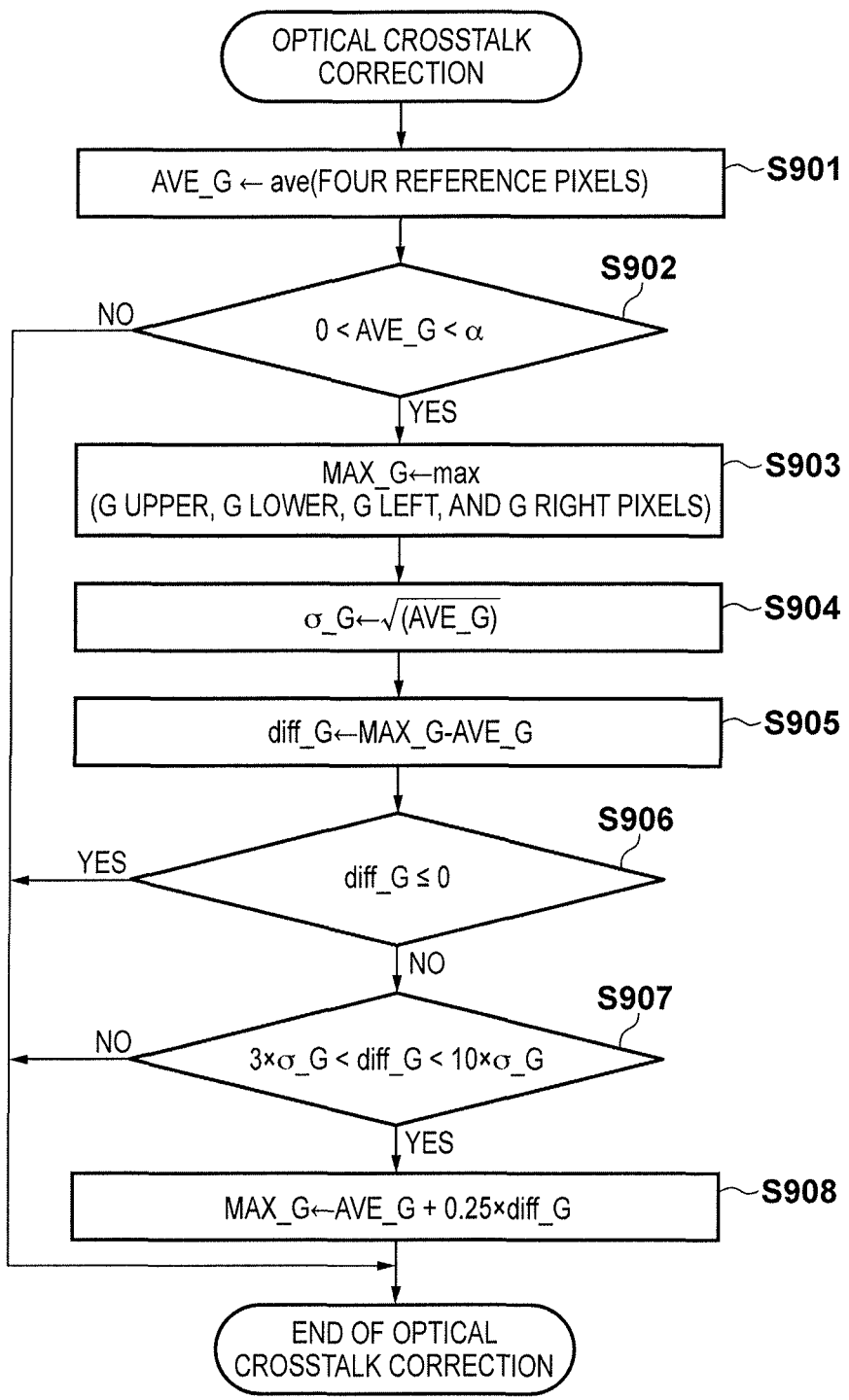
FIG. 12 is a flowchart for explaining optical crosstalk correction according to the first embodiment.

FIG. 12 is a flowchart showing a detailed method of correcting optical crosstalk. The correction method will be described with reference to FIG. 12.

In step S901, the average value of the four reference pixels G1, G2, G3, and G4 is calculated and stored in the variable AVE_G. The process advances to step S902. In step S902, it is determined whether the value AVE_G is larger than 0 and smaller than a predetermined value α. If AVE_G is equal to or smaller than 0 or equal to or larger than α (falls within a predetermined range), correction is unnecessary. Hence, the correction processing ends without performing optical crosstalk correction. On the other hand, if the average value falls between 0 and α, the process advances to step S903.

In this case, 0 output indicates the output level of a light-shielding pixel (to be referred to as an OB pixel hereinafter) (not shown) arranged in the image sensor. If there is the influence of optical crosstalk, the peripheral reference pixels also receive reflected light, and the pixel output level becomes higher than the dark level. If the pixel output is equal to or lower than the OB pixel output level, correction is unnecessary. The value α is set to, for example, the saturation level of the pixel output. When the peripheral reference pixels reach the saturation level, optical crosstalk is difficult to determine, and correction is not performed. If the pixel output is relatively high, the influence of optical crosstalk is slight, as already described. Hence, a predetermined luminance output may be set as the value α in consideration of the assumed influence of the high-luminance light source and the degree of image quality degradation.

In step S903, a pixel having the highest pixel output is selected from the G upper, G lower, G left, and G right pixels that are the correction target pixels, and the output is stored in a variable MAX_G. The process then advances to step S904. As is apparent from FIGS. 6A to 6C, when reflected light enters from the right side of the focus detecting pixel, optical crosstalk that is the subject of this embodiment affects the pixel adjacent to the left side of the focus detecting pixel. That is, the optical crosstalk affects a pixel in a specific direction out of the four upper, lower, left, and right adjacent pixels. Hence, the pixel having the highest output out of the four correction target pixels is corrected at a high possibility.

In step S904, the square root of the AVE_G output stored in step S901 is calculated and stored in a variable σ_G. The process advances to step S905. The value σ_G is equivalent to the σ value of optical shot noise of the reference pixel output average value.

In step S905, the difference between the variables MAX_G and AVE_G is calculated and stored in a variable diff_G. diff_G corresponds to the amount of prominence caused by the optical crosstalk output. When the difference output is calculated, the process advances to step S906.

In step S906, if diff_G is 0 or less, the pixel output is smaller than that of the peripheral reference pixels, and no prominence by optical crosstalk occurs. Hence, the correction processing ends. Otherwise, the process advances to step S907 to continue the correction processing.

In step S907, it is determined based on diff_G whether a prominent output is caused by optical crosstalk. This determination is done by determining how many times larger diff_G is than the random noise σ_G of the reference pixel calculated in step S904. If diff_G is larger than three times σ_G and smaller than 10 times, the process advances to step S908 to perform correction. If diff_G is equal to or smaller than three times, the prominence amount itself is buried in the random noise estimated from the four peripheral reference pixels, and the determination is difficult. Hence, the processing ends without correction. If diff_G is equal to or larger than 10 times, it is not the output influenced by optical crosstalk but a signal from the actual object at a high possibility. Hence, the processing ends without correction.

Note that in this embodiment, a pixel output equal to or smaller than three times is excluded from the correction target. In this case, the correction amount itself is small. Even if the determination is wrong, the image quality degradation itself is slight. Hence, a pixel having an output of 0 or more may be corrected. In this embodiment, the upper limit is set to 10 times. However, an appropriate value can be set by actual shooting examination in consideration of the magnitude of optical crosstalk or a detection error in correction. Comparison with the random noise_G enables accurate detection.

In step S908, the difference between the four peripheral reference pixels and the correction target pixel, that is, diff_G that is the prominence amount by optical crosstalk is multiplied by a predetermined coefficient, 0.25 in this embodiment, and the result is added to AVE_G (AVE_G is equivalent to a value obtained by subtracting the prominence amount from the correction target pixel), thereby performing correction. The resultant value is substituted into the constant MAX_G to generate a correction pixel output, and the correction ends. The correction coefficient is set to 0.25 to make optical crosstalk unnoticeable and suppress image quality degradation when a detection error of the correction target pixel has occurred.

In steps S901 to S908, optical crosstalk correction processing is performed, and the process then returns to the main flow of FIG. 8. In step S1813 of FIG. 8, the DSP 115 performs image correction processing for the image signal read in step S1810, and the image compression circuit 119 performs image conversion to JPEG or the like. After that, the image is recorded in the image data recording medium 401.

(Second Embodiment)

Figure 13:
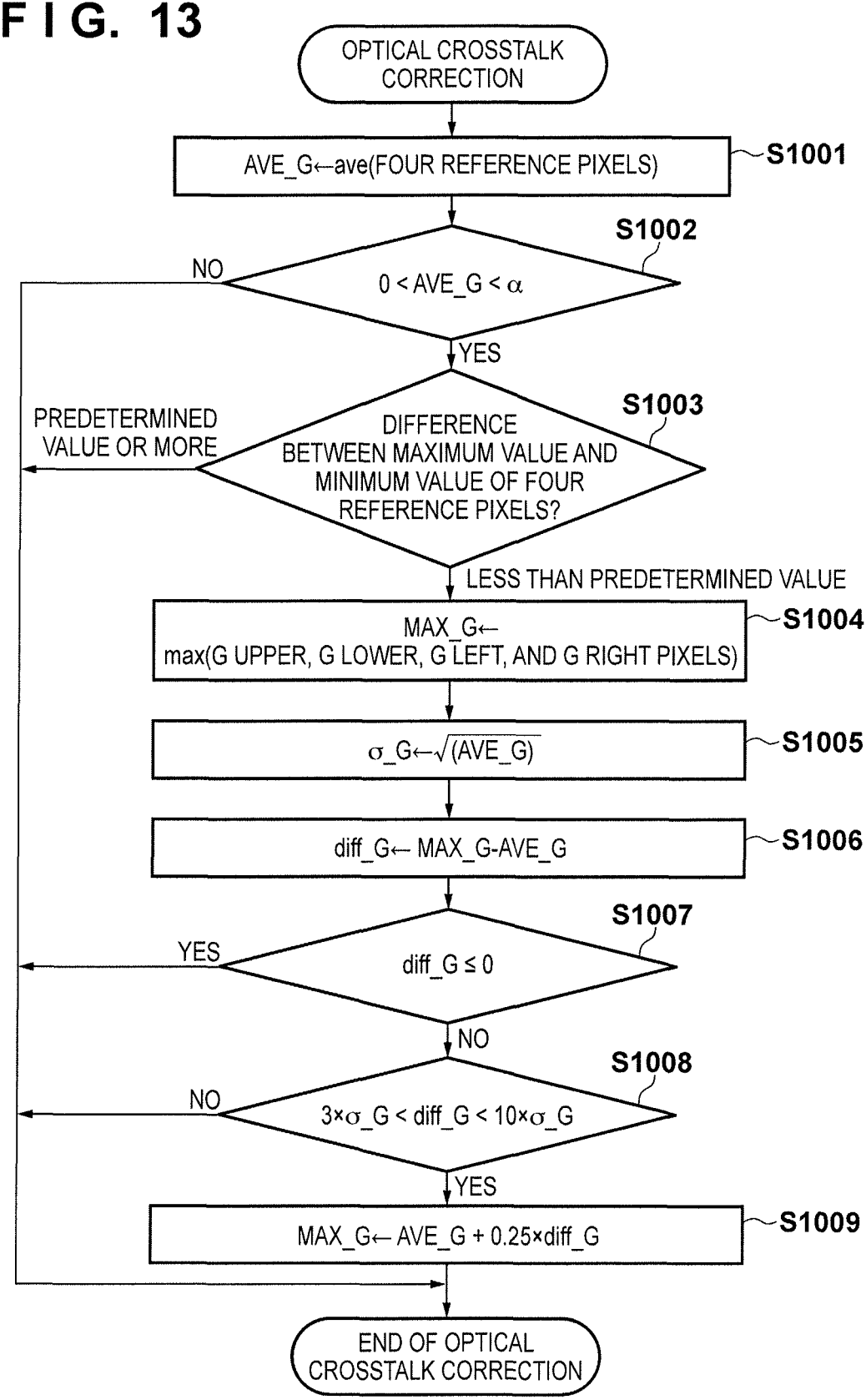
FIG. 13 is a flowchart for explaining optical crosstalk correction according to the second embodiment.

FIG. 13 is a flowchart showing a detailed method of correcting optical crosstalk according to the second embodiment. The correction method according to the second embodiment will be described with reference to FIG. 13.

In the method of the first embodiment, the optical crosstalk correction target pixel can accurately be detected in a flat scene relatively free from contrast. However, in a high-contrast scene having a high spatial frequency, a detection error of the correction target pixel may occur.

In the second embodiment, a processing step of calculating the difference between the maximum value and the minimum value of four reference pixels and, if the difference output is equal to or larger than a predetermined value, prohibiting execution of correction processing is added, thereby suppressing a detection error in a high-contrast object having a high spatial frequency. Details will be described with reference to the flowchart of FIG. 13. The same processes as in the first embodiment will briefly be described.

In step S1001, the average value of four reference pixels G1, G2, G3, and G4 is calculated and stored in a variable AVE_G. The process advances to step S1002. In step S1002, it is determined whether the value AVE_G is larger than 0 and smaller than a predetermined value α. If AVE_G is equal to or smaller than 0 or equal to or larger than α, correction is unnecessary. Hence, the correction processing ends without performing optical crosstalk correction. If the average value falls between 0 and α, the process advances to step S1003.

In step S1003, the difference between the maximum value and the minimum value of the four reference pixels is calculated. If the difference is equal to or larger than a predetermined value, and the object can be estimated as an object having contrast, the correction processing ends. If the difference is smaller than the predetermined value, the process advances to step S1004 to continue the correction processing. The reason why correction processing is not performed when the difference between the maximum value and the minimum value of the four reference pixels is equal to or larger than the predetermined value is as follows. First, when the difference between the maximum value and the minimum value of the four reference pixels is equal to or larger than the predetermined value, the spatial frequency of the object is high, and the average value of the four reference pixels shifts due to the contrast. It is therefore difficult to estimate the optical crosstalk amount to be detected, and detection errors increase. Second, since image quality degradation by optical crosstalk is unnoticeable in the high-frequency object, image quality degradation can be suppressed by prohibiting execution of correction processing.

In step S1004, a pixel having the highest pixel output is selected from the G upper, G lower, G left, and G right pixels that are the correction target pixels, and the output is stored in a variable MAX_G. The process then advances to step S1005. In step S1005, the square root of AVE_G stored in step S1001 is calculated and stored in a variable σ_G. The process advances to step S1006.

In step S1006, the difference between the variables MAX_G and AVE_G is calculated and stored in a variable diff_G. diff_G corresponds to the amount of prominence caused by the optical crosstalk output. When the difference output is calculated, the process advances to step S1007.

In step S1007, if diff_G is 0 or less, the pixel output is smaller than that of the peripheral reference pixels, and no prominence by optical crosstalk occurs. Hence, the correction processing ends. Otherwise, the process advances to step S1008 to continue the correction processing.

In step S1008, it is determined based on diff_G whether a prominent output is caused by optical crosstalk. This determination is done by determining how many times larger diff_G is than the random noise σ_G of the reference pixel calculated in step S1005. If diff_G is larger than three times σ_G and smaller than 10 times, the process advances to step S1009 to perform correction. If diff_G is equal to or smaller than three times, the prominence amount itself is buried in the random noise estimated from the four peripheral reference pixels, and the determination is difficult. Hence, the processing ends without correction. If diff_G is equal to or larger than 10 times, it is not the output influenced by optical crosstalk but a signal from the actual object at a high possibility. Hence, the processing ends without correction.

In step S1009, the difference between the four peripheral reference pixels and the correction target pixel, that is, diff_G that is the prominence amount by optical crosstalk is multiplied by a predetermined coefficient, 0.25 in this embodiment, and the result is added to AVE_G (AVE_G is equivalent to a value obtained by subtracting the prominence amount from the correction target pixel), thereby performing correction. The resultant value is substituted into the constant MAX_G to generate a correction pixel output, and the correction ends. The correction coefficient is set to 0.25 to make optical crosstalk unnoticeable and suppress image quality degradation when a detection error of the correction target pixel has occurred.

As described above, according to the second embodiment, it is judged using the contrast information of the object whether to perform correction. This enables to optical crosstalk correction with little detection errors.

(Third Embodiment)

Figure 14:
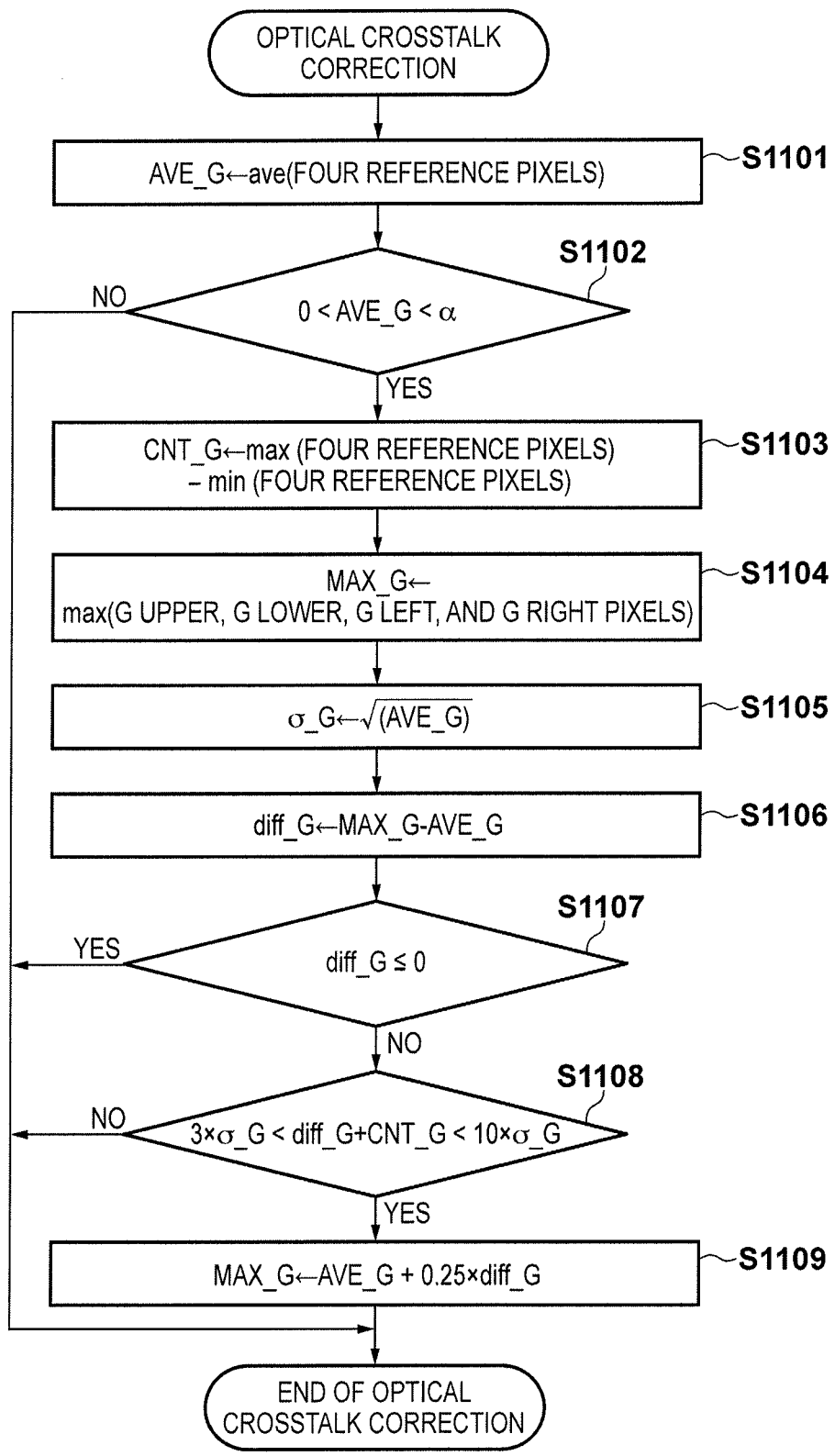
FIG. 14 is a flowchart for explaining optical crosstalk correction according to the third embodiment.

FIG. 14 is a flowchart showing a detailed method of correcting optical crosstalk according to the third embodiment. The correction method according to the third embodiment will be described with reference to FIG. 14.

In the first embodiment, the optical crosstalk correction target pixel can accurately be detected in a flat scene relatively free from contrast. However, in a high-contrast scene having a high spatial frequency, a detection error of the correction target pixel may occur.

In the second embodiment, a processing step of calculating the difference between the maximum value and the minimum value of four reference pixels and, if the difference output is equal to or larger than a predetermined value, prohibiting execution of correction processing is added, thereby suppressing a detection error in a high-contrast object having a high spatial frequency. However, since execution/nonexecution of correction is determined indiscriminately based the difference between the maximum value and the minimum value of the four reference pixels, detection of optical crosstalk that occurs in a low-contrast object may fail.

The third embodiment further improves the detection ratio in a low-contrast scene. To improve the detection ratio in a low-contrast scene and prevent a detection error in a high-contrast scene, the detection threshold of the correction target pixel is changed in accordance with the contrast of the four reference pixels. Details will be described below with reference to the flowchart. The same processes as in the first and second embodiments will briefly be described.

In step S1101, the average value of four reference pixels G1, G2, G3, and G4 is calculated and stored in a variable AVE_G. The process advances to step S1102. In step S1102, it is determined whether the value AVE_G is larger than 0 and smaller than a predetermined value α. If AVE_G is equal to or smaller than 0 or equal to or larger than α, correction is unnecessary. Hence, the correction processing ends without correcting optical crosstalk. If the average value falls between 0 and α, the process advances to step S1103.

In step S1103, the difference between the maximum value and the minimum value of the four reference pixels is calculated and stored in a variable CNT_G. The process then advances to step S1104. In step S1104, a pixel having the highest pixel output is selected from the G upper, G lower, G left, and G right pixels that are the correction target pixels, and the output is stored in a variable MAX_G. The process then advances to step S1105.

In step S1105, the square root of AVE_G stored in step S1101 is calculated and stored in a variable σ_G. The process advances to step S1106. In step S1106, the difference between the variables MAX_G and AVE_G is calculated and stored in a variable diff_G. diff_G corresponds to the amount of prominence caused by the optical crosstalk output. When the difference output is calculated, the process advances to step S1107.

In step S1107, if diff_G is 0 or less, the pixel output is smaller than that of the peripheral reference pixels, and no prominence by optical crosstalk occurs. Hence, the correction processing ends. Otherwise, the process advances to step S1108 to continue the correction processing.

In step S1108, it is determined based on diff_G whether a prominent output is caused by optical crosstalk. Basically, as in the first and second embodiments, this determination is done by determining how many times larger diff_G is than the random noise σ_G of the reference pixel calculated in step S1105.

Unlike the first and second embodiments, diff_G and CNT_G are added. If the addition result is larger than three times σ_G and smaller than 10 times, the process advances to step S1109 to perform correction. When it is determined using addition of diff_G and CNT_G whether to correct the correction target pixel, the detection level can be changed in accordance with the contrast of the four reference pixels. If the four reference pixels are flat without contrast, the same detection level as in the first and second embodiments is set. If the reference pixels have contrast, the detection level can be shifted to a lower value. This makes it possible to detect the correction pixel while suppressing a detection error. Upon determining the pixel as the correction target in step S1108, the process advances to step S1109 to execute correction. Upon determining that the pixel is excluded from the correction target, the correction processing ends.

In step S1109, the difference between the four peripheral reference pixels and the correction target pixel, that is, diff_G that is the prominence amount by optical crosstalk is multiplied by a predetermined coefficient, 0.25 in this embodiment, and the result is added to AVE_G (AVE_G is equivalent to a value obtained by subtracting the prominence amount from the correction target pixel), thereby performing correction. The resultant value is substituted into the constant MAX_G to generate a correction pixel output, and the correction ends. The correction coefficient is set to 0.25 to make optical crosstalk unnoticeable and suppress image quality degradation when a detection error of the correction target pixel has occurred.

As described above, the threshold used to detect the correction target pixel is changed based on the contrast value of the four reference pixels.

This makes it possible to improve the detection ratio in a low-contrast scene and prevent a detection error in a high-contrast scene.

(Fourth Embodiment)

A correction operation in live view shooting of a camera according to the fourth embodiment will be described with reference to FIGS. 15 and 16. The arrangement of the camera system according to the fourth embodiment is the same as in the first embodiment, and a description thereof will be omitted. In addition, a description of blocks having the same reference numerals as in the first embodiment will be omitted.

Figure 15:
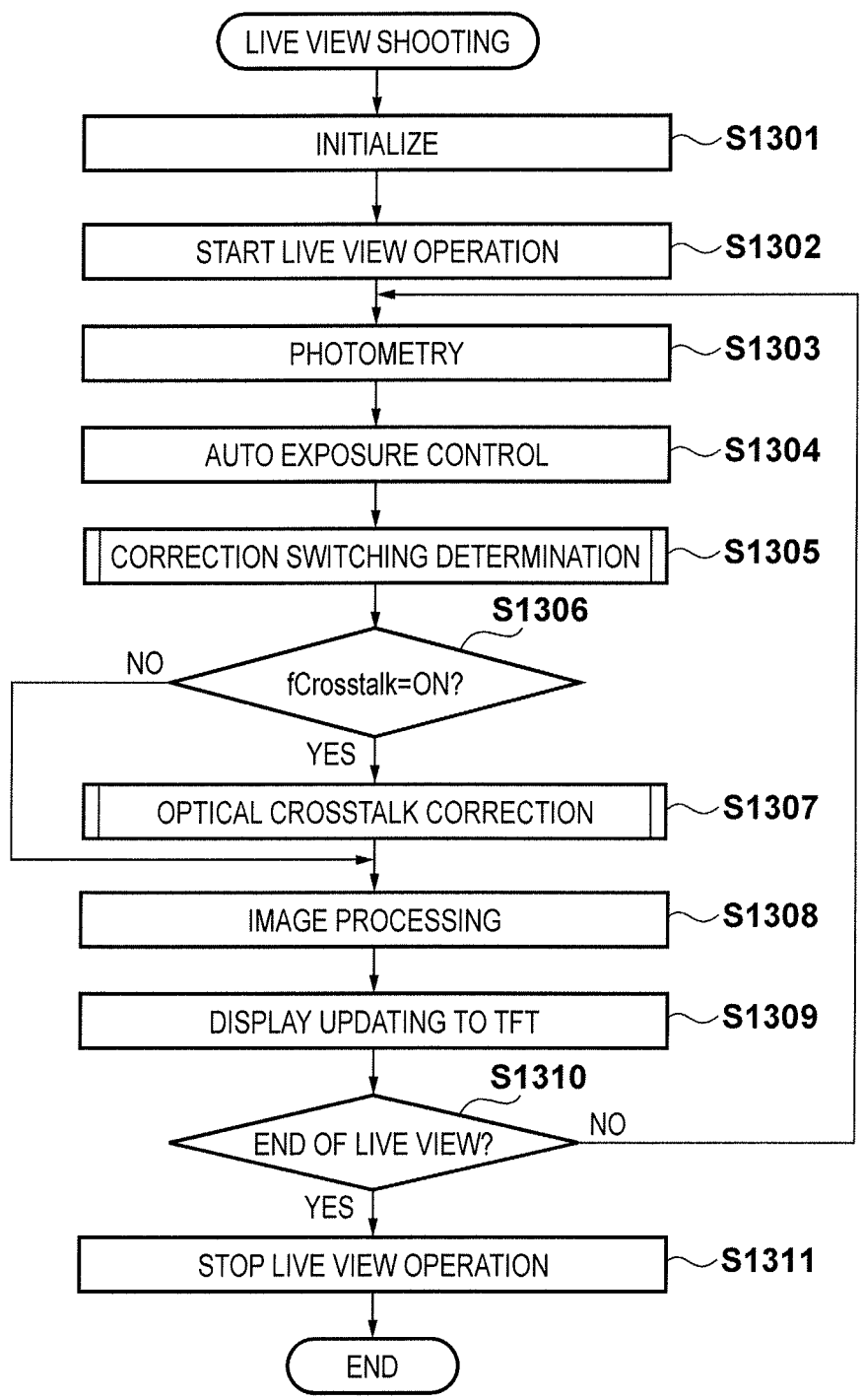
FIG. 15 is a flowchart for explaining a shooting operation according to the fourth embodiment.

FIGS. 15 and 16 are flowcharts for explaining the correction operation according to this embodiment.

In step S1301, when the operator turns on the power switch of the camera, a system controller 120 confirms the operations of the actuators and the image sensor in the camera and initializes the memory contents and execution programs, and also executes a pre-shooting operation.

In step S1302, so-called live view shooting is started so that image signals are sequentially read from an image sensor 112 and displayed on an external liquid crystal display device 124 or recorded in an image data recording medium 401 as a moving image.

In step S1303, the image signals read from the image sensor 112 are added on the Bayer basis for each predetermined divided region and undergo count processing of counting the number of pixels each of which outputs a luminance signal having a predetermined value or more by a DSP 115, and are then supplied to the system controller 120. The predetermined value used in count processing is an appropriate threshold used to detect the detection level of a pixel signal. Based on the result supplied from the DSP 115, the system controller 120 calculates the luminance of the object for each divided photometry region. Furthermore, averaging and correction calculation are performed based on a predetermined algorithm, thereby calculating a photometric value indicating the brightness of the object in the shot image region.

In step S1304, the system controller 120 performs exposure control value calculation to decide the exposure condition in the live view shooting. As the exposure control value calculation, the stop, ISO speed, accumulation time, and the like are adjusted based on the program diagram and the photometric value calculated in step S1303, thereby performing auto exposure control (AE). When a manual exposure mode is set, the exposure is decided based on the stop, accumulation time, and ISO speed designated by the operator, and shooting exposure is adjusted.

In step S1305, the system controller 120 executes correction operation switching determination according to this embodiment. In the correction operation switching determination, it is determined whether to execute optical crosstalk correction in live view shooting.

The image quality degradation by optical crosstalk occurs when the shooting light beam partially enters the photodiode at a specific angle, as described above. Especially, the image quality degradation poses a problem when a high-luminance light source such as the sun or spotlight exists in the object to be shot or in, for example, a night scene with dark background.

In optical crosstalk correction processing described in the first embodiment, correction target pixel determination is done to determine on the pixel basis whether optical crosstalk occurs, and execution of correction processing is switched. However, an object of a specific pattern such as a small point source yields an adverse effect of correction so that a detection error occurs in the correction target pixel determination, and the original object is erroneously corrected.

To prevent this, in this embodiment, a scene where image quality degradation by optical crosstalk occurs is determined based on high-luminance light source detection and the shooting conditions, and the correction operation is appropriately performed, thereby suppressing the image quality degradation by the adverse effect of correction. In this embodiment, the high-luminance light source is detected from the image signal of the image sensor 112. As the image sensor 112, a sensor of a type that linearly changes the output signal with respect to the brightness of the object is normally used. Hence, as compared to the photometry sensor, the dynamic range is narrow, and the image signal of a high-luminance object is saturated. It is therefore difficult to measure an accurate luminance value. In the correction operation switching determination according to this embodiment, the count value of the number of pixels each of which outputs a luminance signal having a predetermined value or more, which is detected in step S1303, is used, thereby detecting the high-luminance light source.

FIG. 16 is a flowchart for explaining details of correction operation switching determination according to this embodiment.

In step S1401, the photometric value calculated in step S1303 of FIG. 15 is stored in a variable Bv.

In step S1402, the maximum value of the count value of the number of pixels each of which outputs a luminance signal having a predetermined value or more, which is calculated for each divided region in step S1303 of FIG. 15 is stored in a variable OverPixCount.

In step S1403, the variable Bv is compared with a threshold Bv_th1. If the variable Bv is smaller than the threshold, the process advances to step S1405 to store a predetermined value PixCount_th1 in a variable PixCount_th. If the variable Bv is equal to or larger than the threshold, the process advances to step S1404. As the threshold Bv_th1, an appropriate luminance value used to determine, for example, a night scene is set.

In step S1404, the variable Bv is compared with a threshold Bv_th2. If the variable Bv is smaller than the threshold, the process advances to step S1406 to store a predetermined value PixCount_th2 in the variable PixCount_th. If the variable Bv is equal to or larger than the threshold, the process advances to step S1407 to store a predetermined value PixCount_th3 in the variable PixCount_th. As the threshold Bv_th2, an appropriate luminance value used to determine, for example, a daytime scene is set.

In steps S1403 to S1407, shooting scene determination is done based on the photometric value, and the variable PixCount_th of an appropriate correction switching determination threshold is set for each shooting scene in which the optical crosstalk occurrence condition is different. The correction switching determination threshold is preferably appropriately set in accordance with the condition and frequency of noticeable optical crosstalk via actual shooting or the like.

In step S1408, the variable OverPixCount is compared with the variable PixCount_th. That is, in the live view shooting, it is determined whether the number of pixels that cause luminance saturation is equal to or larger than a predetermined value (saturated pixel count), thereby detecting a high-luminance light source. If the variable OverPixCount is larger than the threshold, the process advances to step S1409 to set ON in a variable fCrosstalk that is the enable flag of the optical crosstalk correction operation. If the variable OverPixCount is equal to or smaller than the threshold, the process advances to step S1410 to set OFF in the variable fCrosstalk that is the enable flag of the optical crosstalk correction operation.

In steps S1401 to S1410, the correction operation switching determination is performed, and the process then returns to the main flow of FIG. 15.

In step S1306 of FIG. 15, it is determined that the variable fCrosstalk that is the enable flag of the optical crosstalk correction operation determined in step S1305 is ON. If the variable fCrosstalk is ON, the process advances to step S1307. If the variable fCrosstalk is not ON, the process advances to step S1308.

In step S1307, the optical crosstalk correction processing according to this embodiment is executed for each pixel. The optical crosstalk correction processing is the same as in the first embodiment, and a description thereof will be omitted.

In step S1308, the image signal read in step S1302 is corrected by the DSP 115 and transferred to the VRAM in step S1309, and display updating to the TFTs is performed.

In step S1310, it is determined whether the operator turns on the switch to end the live view. If the switch is not turned on, the process returns to step S1303 to continue the live view. If the switch is turned on, the process advances to step S1311 to perform live view operation end processing and various kinds of camera end processing so that a sleep state is set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-037693, filed Feb. 27, 2013, and 2013-051137 filed Mar. 14, 2013, which are hereby incorporated by reference herein in their entirety.

What is claimed is:

1. An image capturing apparatus comprising:
   an image sensor configured to include a plurality of first pixels and a second pixel having a photoelectric conversion area which is more greatly shielded from light than a photoelectric conversion area of the first pixel;
   a comparison unit configured to compare outputs of the first pixels as a plurality of correction target pixels with outputs of the first pixels as a plurality of reference pixels which are arranged at a position more distant from the second pixel than the correction target pixels; and
   a correction unit configured to execute correction processing of the correction target pixels in accordance with a comparison result of the comparison unit,
   wherein the correction unit executes the correction processing when the outputs of the plurality of reference pixels are within a predetermined range, and does not execute the correction processing when the outputs of the plurality of reference pixel is beyond the predetermined range.

2. The apparatus according to claim 1, wherein the correction unit calculates a correction amount of the outputs of the first pixels as the plurality of correction target pixels based on a pixel having a highest output level out of the first pixels as the plurality of correction target pixels.

3. The apparatus according to claim 1, wherein the correction unit calculates random noise of the reference pixels based on an average value of the outputs of the plurality of reference pixels.

4. The apparatus according to claim 1, wherein the correction unit calculates a difference between the outputs of the first pixels as the plurality of correction target pixels and an average value of the outputs of the plurality of reference pixels, and executes the correction processing when the calculated difference is not less than a predetermined value.

5. The apparatus according to claim 4, wherein the correction unit calculates a correction amount of the outputs of the first pixels as the plurality of correction target pixels by multiplying the difference by a predetermined coefficient.

6. The apparatus according to claim 1, wherein the correction unit calculates a contrast value based on a difference between a maximum value and a minimum value of the outputs of the plurality of reference pixels, and compares the contrast value with a predetermined value, thereby judging whether to execute the correction processing.

7. The apparatus according to claim 6, wherein the correction unit shifts the predetermined value to be compared with the contrast value in accordance with the contrast value.

8. The apparatus according to claim 1, further comprising:
   a photometry unit configured to detect a luminance value of an object; and
   a correction switching unit configured to switch an operation of the correction unit in accordance with an output of the photometry unit.

9. The apparatus according to claim 8, wherein the correction switching unit enables the operation of the correction unit when the luminance value of the object detected by the photometry unit is included in a predetermined luminance range.

10. The apparatus according to claim 8, wherein the photometry unit outputs the luminance value of the object in each of a plurality of divided regions, and
    the correction switching unit enables the operation of the correction unit when a maximum luminance value in the plurality of divided regions is not less than a predetermined value.

11. The apparatus according to claim 8, further comprising an exposure control unit configured to set an exposure condition in a shooting operation,
    wherein the correction switching unit enables the operation of the correction unit when a difference between the luminance value of the object detected by the photometry unit and a shooting exposure control value set by the exposure control unit is not less than a predetermined value.

12. The apparatus according to claim 11, wherein the correction switching unit selects the predetermined value in accordance with the luminance value of the object detected by the photometry unit.

13. The apparatus according to claim 8, further comprising a saturated pixel count unit configured to count the number of pixels having not less than a predetermined luminance value,
    wherein the correction switching unit enables the operation of the correction unit when the number of pixels counted by the saturated pixel count unit is not less than a predetermined number of pixels.

14. The apparatus according to claim 1, wherein the image sensor has a plurality of second pixels.

15. The apparatus according to claim 14, wherein the second pixels are arranged more discretely than the first pixels.

16. The apparatus according to claim 1, wherein each of the second pixels has an opening which makes light enter to the photoelectric conversion area of the second pixel.

17. The apparatus according to claim 16, wherein a center of the opening is shifted from a center of the second pixel.

18. The apparatus according to claim 1, wherein the correction unit executes the correction processing when the calculated average value of the outputs of the plurality of reference pixels is within a predetermined range, and does not executes the correction processing when the calculated average value is beyond the predetermined range.

19. An image capturing apparatus comprising:
    an image sensor configured to include a plurality of first pixels and a second pixel having a photoelectric conversion area which is more greatly shielded from light than a photoelectric conversion area of the first pixel;
    a comparison unit configured to compare outputs of the first pixels as a plurality of correction target pixels with outputs of the first pixels as a plurality of reference pixels which are arranged at a position more distant from the second pixel than the correction target pixels; and
    a correction unit configured to execute correction processing of the correction target pixels in accordance with a comparison result of said comparison unit,
    wherein the correction unit executes the correction processing when a difference, which is a difference between the outputs of the first pixels as the plurality of correction target pixels and the outputs of the plurality of reference pixels, is not less than a predetermined value, and does not execute the correction processing when the difference is less than the predetermined value.

20. The apparatus according to claim 19, wherein the correction unit calculates a correction amount of the outputs of the first pixels as the plurality of correction target pixels based on a pixel having a highest output level out of the first pixels as the plurality of correction target pixels.

21. The apparatus according to claim 19, wherein the correction unit calculates random noise of the reference pixels based on an average value of the outputs of the plurality of reference pixels.

22. The apparatus according to claim 19, wherein the correction unit calculates a correction amount of the outputs of the first pixels as the plurality of correction target pixels by multiplying the difference by a predetermined coefficient.

23. The apparatus according to claim 19, wherein the correction unit calculates a contrast value based on a difference between a maximum value and a minimum value of the outputs of the plurality of reference pixels, and compares the contrast value with a predetermined value, thereby judging whether to execute the correction processing.

24. The apparatus according to claim 23, wherein the correction unit shifts the predetermined value to be compared with the contrast value in accordance with the contrast value.

25. The apparatus according to claim 19, further comprising:
a photometry unit configured to detect a luminance value of an object; and
a correction switching unit configured to switch an operation of the correction unit in accordance with an output of the photometry unit.

26. The apparatus according to claim 25, wherein the correction switching unit enables the operation of the correction unit when the luminance value of the object detected by the photometry unit is included in a predetermined luminance range.

27. The apparatus according to claim 25, wherein the photometry unit outputs the luminance value of the object in each of a plurality of divided regions, and
the correction switching unit enables the operation of the correction unit when a maximum luminance value in the plurality of divided regions is not less than a predetermined value.

28. The apparatus according to claim 25, further comprising an exposure control unit configured to set an exposure condition in a shooting operation,
wherein the correction switching unit enables the operation of the correction unit when a difference between the luminance value of the object detected by the photometry unit and a shooting exposure control value set by the exposure control unit is not less than a predetermined value.

29. The apparatus according to claim 28, wherein the correction switching unit selects the predetermined value in accordance with the luminance value of the object detected by the photometry unit.

30. The apparatus according to claim 25, further comprising a saturated pixel count unit configured to count the number of pixels having not less than a predetermined luminance value,
wherein the correction switching unit enables the operation of the correction unit when the number of pixels counted by the saturated pixel count unit is not less than a predetermined number of pixels.

31. The apparatus according to claim 19, wherein the image sensor has a plurality of second pixels.

32. The apparatus according to claim 31, wherein the second pixels are arranged more discretely than the first pixels.

33. The apparatus according to claim 19, wherein each of the second pixels has an opening which makes light enter to the photoelectric conversion area of the second pixel.

34. The apparatus according to claim 33, wherein a center of the opening is shifted from a center of the second pixel.

35. The apparatus according to claim 19, wherein the correction unit executes the correction processing when a difference, which is a difference between the outputs of the first pixels as the plurality of correction target pixels and an average value of the outputs of the plurality of reference pixels, is not less than a predetermined value, and does not execute the correction processing when the difference is less than the predetermined value.

* * * * *